United States Patent [15] 3,644,180

Burock et al. [45] Feb. 22, 1972

[54] METHODS OF USING INORGANIC RESISTS

[72] Inventors: Russell Burock, Allentown; David M. Swirsky, Minersville; Robert A. Whitner, Allentown, all of Pa.

[73] Assignee: Western Electric Company, Incorporated, New York, N.Y.

[22] Filed: Feb. 26, 1970

[21] Appl. No.: 14,478

[52] U.S. Cl. ..... 204/15, 29/578, 204/143 GE

[51] Int. Cl. ..... C23b 5/48, B23p 1/00, B01i 17/00

[58] Field of Search ..... 204/15, 143 GE; 29/578

[56] References Cited

UNITED STATES PATENTS

| | | | |
|---|---|---|---|
| 3,025,589 | 3/1962 | Hoerni | 29/578 |
| 3,206,827 | 9/1965 | Kriegsman | 29/578 |
| 3,274,670 | 9/1966 | Lepselter | 29/578 |
| 3,382,568 | 5/1968 | Kuiper | 29/578 |
| 3,387,358 | 6/1968 | Heiman | 29/571 |
| 3,438,121 | 4/1969 | Wanlass et al. | 29/578 |
| 3,440,114 | 4/1969 | Harper | 148/187 |
| 3,507,756 | 4/1970 | Wenger | 204/15 |

FOREIGN PATENTS OR APPLICATIONS

| | | |
|---|---|---|
| 1,289,714 | 2/1969 | Germany |

*Primary Examiner*—John H. Mack
*Assistant Examiner*—T. Tufariello
*Attorney*—W. M. Kain, R. P. Miller, R. Y. Peters and P. J. Tribulski, Jr.

[57] ABSTRACT

Chemical treatment of surfaces is limited to selected portions of the surface by applying inorganic resists to the surface in a desired pattern. In a specific example, silicon dioxide is deposited at a low temperature on a titanium surface surrounding a platinum interconnection pattern on a silicon semiconductor slice. The silicon dioxide is patterned to expose the platinum but cover the titanium. Gold is then electroplated onto the platinum in a well-defined pattern.

11 Claims, 13 Drawing Figures

INVENTORS
R. BUROCK
D.M. SWIRSKY
R.A. WHITNER
BY [signature]
ATTORNEY

METHODS OF USING INORGANIC RESISTS

FIELD OF THE INVENTION

This invention relates to a method of achieving good adherence of a resist material to a metallic surface. More particularly, the invention relates to the use of a patterned inorganic resist material to achieve chemical altering of selected and very accurately defined areas of a metallic surface.

DESCRIPTION OF THE PRIOR ART

In the field of microelectronics, it has long been a practice to use organic photoresists to produce patterns on substrates. These organic resists have been the standard medium for pattern generation. They have been used to isolate etching to selected areas and also to isolate plating to selected areas.

Continual problems have existed in the use and application of organic resists in microelectronics. Not the least of the problems has been that of uncertain adherence of the resist material to an underlying metallic surface.

Such lack of adherence becomes increasingly troublesome when miniaturization is pushed further and further toward its limits. Line widths of conductors are reduced and the spacings between conductors are reduced in attempts to reduce costs and to achieve electronic devices capable of operating at higher and higher speeds and frequencies.

Even the slightest degree of nonadherence of a resist on a metallic surface can result in an open circuit or a short circuit where line widths and spaces are down to the order of 0.0002 inch. And, many in-process failures of microelectronic devices can be traced to just such a lack of adherence.

Many attempts have, of course, been made to improve the adherence and, in specific cases, these attempts have been successful. For example, a resist adherence problem was occurring quite often after a device had been subjected to treatment in hydrofluoric acid. It was found that some fluoride ions remained on the surface after the treatment. The fluoride ions were removed in an oxidation step and these particular adherence problems were eliminated.

However, it must be noted that exhaustive analytical work was required to identify the problem as a presence of fluoride ions. Such analytical work is, of course, expensive and time consuming.

In some cases many and varied forms of chemical processing are performed on a surface prior to an attempt to place a resist on that surface. In such complex situations if a lack of adherence of the resist develops, the analysis of the cause becomes virtually impossible.

SUMMARY OF THE INVENTION

It is an object of the invention to provide a system for reducing the deleterious effects of poor adherence of an organic resist material to a substrate.

It is a further object of the invention to provide a resist system which will provide a desired degree of adherence to a surface where a high probability for complex contamination of the surface exists.

These and other objects are achieved by depositing a film of inorganic material on a metallic surface prior to generation of a pattern on the surface.

The inorganic material is patterned and etched into a desired configuration and chemical operations are conducted on exposed portions of the metallic surface using the inorganic material as a resist. Improved pattern definition and a capability for achieving small line widths are thereby achieved.

BRIEF DESCRIPTION OF THE DRAWINGS

Other objects and features of the present invention will be more readily understood from the following detailed description of specific embodiments thereof when read in conjunction with the appended drawings in which.

DETAILED DESCRIPTION

Illustratively, the invention is described in connection with a deposition of a silicon dioxide coating on a metallic surface as a resist material. However, it is to be understood that many inorganic substances can be used to achieve the improvements of the invention.

FIGS. 1 through 6 show a general technique for practicing the inventive method. The ultimate goal is to produce an electrochemical reaction on selected portions of a metallic coating 20 which is deposited on a substrate 22.

Figure 1:
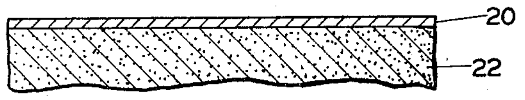
FIG. 1 is a sectional view of a portion of a substrate having a metallic coating thereon to be chemically altered.
Figure 2:
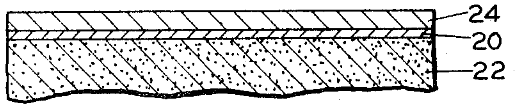
FIG. 2 is a view of the substrate and metallic coating of FIG. 1 onto which a coating of inorganic resist material has been applied.

A first step of the inventive method is illustrated in FIG. 2. A continuous coating 24 of inorganic resist material is applied to the metallic coating 20. The coating 24 of inorganic resist is applied in a thermally induced reaction process. Examples of inorganic resists might include silicon dioxide, silicon nitride, silicon oxynitride or doped silicon dioxide.

One very significant aspect of the process by which the coating 24 of inorganic resist is applied is that the reactions must take place at a high enough temperature to provide substantial adherence between the inorganic resist and the metal. Such high-temperature reactions, in the range of 200° to 500° C., result in a tight adherence of the coating 24 even in the presence of metallic surfaces that were contaminated prior to the beginning of deposition of the film.

Figure 3:
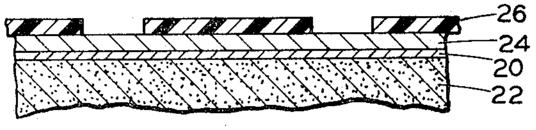
FIG. 3 is a view of the material of FIG. 2 in which the inorganic resist material has had a patterned layer of photoresist applied thereto.

FIG. 3 illustrates the next steps in the inventive method. A layer 26 of conventional photoresist is applied to the top of the coating 24 of the inorganic resist after the coating is cooled from the deposition reaction. A pattern is generated in the layer 26 of photoresist using conventional masking, exposing and developing steps.

Figure 4:
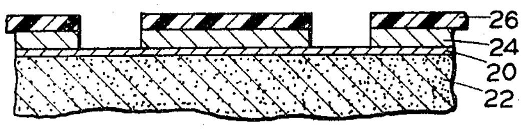
FIG. 4 is a view of the materials of FIG. 3 after the inorganic resist material has been etched to expose selected portions of the metallic coating.

After the photoresist layer 26 is shaped to the desired pattern, the exposed portions of the inorganic resist coating 24 are etched away using suitable selective etchants to leave the structure shown in FIG. 4.

With selected portions of the metallic coating 20 exposed and the other portions of the metallic coating covered with the tightly adhering coating 24, an electrochemical reaction can be conducted on the exposed portions of the coating 20 with very little risk of the electrochemical reaction taking place on any portions of the coating 20 except those which are intentionally exposed.

Figure 5:
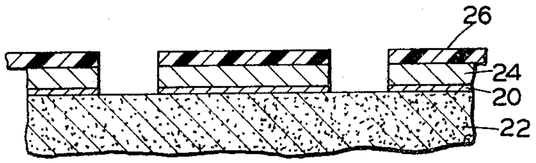
FIG. 5 is a view of the material of FIG. 4 after the exposed portions of the metallic coating are etched away.
Figure 6:
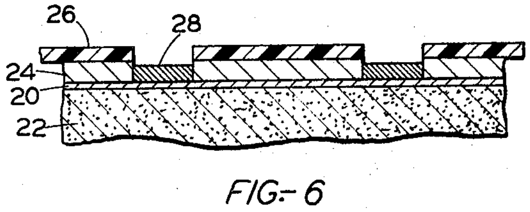
FIG. 6 is a view of the material of FIG. 4 after the exposed portions of the metallic coating have additional metal plated thereto.

FIG. 5 illustrates a situation in which it is desired to selectively remove the exposed portions of the metallic coating 20 by etching and FIG. 6 alternatively shows a situation in which it is desired to introduce a new metal onto the exposed portions of the metallic coating during a plating operation. The plates metal is designated by the numeral 28.

If it is desired to expose the remaining portions of the metallic coating 20 after the selective electrochemical reactions have occurred, the photoresist layer 26 can be removed using conventional solvents and the inorganic resist coating 24 can be removed with the previously used selective etchant.

EXAMPLE

Figure 7:
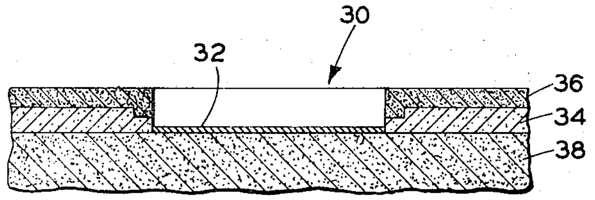
FIG. 7 is a sectional view through a contact region of an integrated circuit chip prior to completion of the contact.

A specific example of the use of the inventive method is illustrated in FIGS. 7 through 13. FIG. 7 shows a portion of an integrated circuit chip, designated generally by the numeral 30, at a contact region. The structure of the integrated circuit chip and the metallurgy of the contact region can be best understood by referring to an article by S. S. Hause and R. A. Whitner, "Manufacturing Beam-Lead, Sealed-Junction etc." *The Western Electric Engineer*, Dec. 1967, Vol. XI, No. 4, pp. 3–15.

Figure 8:
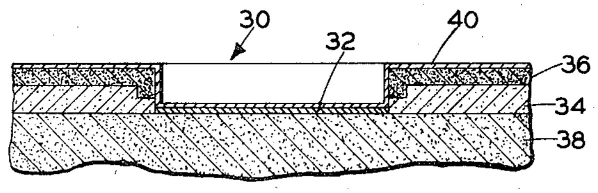
FIG. 8 is a view of the material of FIG. 7 after a layer of titanium is sputtered on the outer surface thereof.
Figure 9:
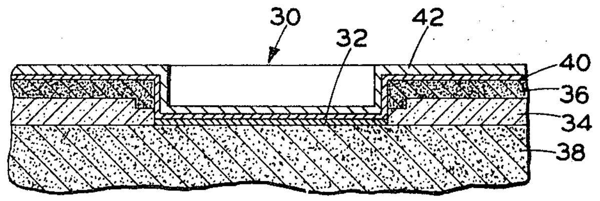
FIG. 9 is a view of the material of FIG. 8 after a layer of platinum is sputtered over the titanium.
Figure 10:
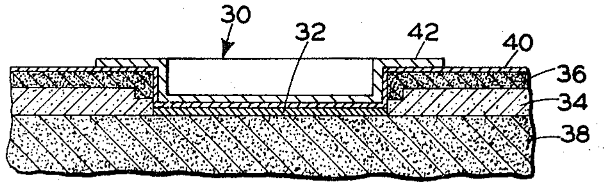
FIG. 10 is a view of the material of FIG. 9 after the platinum is etched to define an interconnection pattern.

The contact region includes a layer of platinum silicide 32 surrounded by a layer of silicon dioxide 34 and silicon nitride 36 all formed on a base of silicon 38. In a sputtering operation a layer 40 of titanium was produced to a thickness of approximately 0.05 micron, as shown in FIG. 8. Over the titanium layer 40 a layer of platinum 42 is sputtered to a thickness of 0.15 micron.

The platinum layer 42 is used as the basis of a platinum interconnection pattern and those portions of the platinum which are not useful in the interconnection pattern were etched away in a solution consisting of 5 parts water, 4 parts concentrated nitric acid and 1 part concentrated hydrochloric acid.

The silicon slice 38 on which many of the integrated circuit chips 30 are formed was then placed in a reaction chamber for deposition of the inorganic resist material which in this case, was silicon dioxide. A conventional low-temperature oxide deposition reactor was used.

The slices 38 were heated to a temperature of 350° C. while silane, oxygen and nitrogen were flowing through the chamber. Oxygen was introduced at a rate of 40 cc. per minute in a nitrogen carrier of 4.56 liters per minute. Silane was introduced at a rate of 400 cc. per minute in a nitrogen carrier which was introduced at a rate of 30 liters per minute. The reactor had a volume of 6.5 liters.

Figure 11:
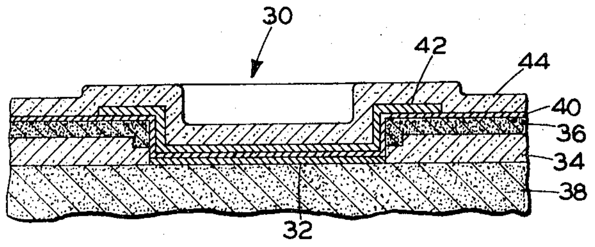
FIG. 11 is a view of the material of FIG. 10 after a layer of silicon dioxide is applied to the titanium and remaining platinum.

Seven round wafers of a diameter of 1.5 inches were placed in the reactor on a rotatable hotplate. A dummy wafer was also included for observation purposes. The reaction was allowed to continue for approximately 5 minutes until a reddish purple color developed on the dummy silicon wafer indicating an oxide thickness of approximately 3,000 A. After the purple color associated with a 3,000 A. thickness was noted, the rotation of the heated plate was stopped and the reactor was purged for 3 minutes. It was important in this reaction to keep the temperature below 360° C. because higher temperatures would have had deleterious effect on the constituents of the slice 38. FIG. 11 illustrates the result of such reaction, i.e., a coating 44 of silicon dioxide.

Figure 12:
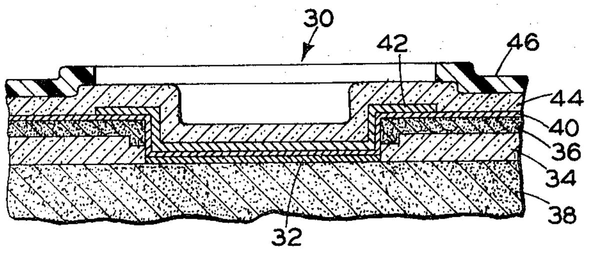
FIG. 12 is a view of the materials of FIG. 11 after a patterned layer of photoresist is applied.
Figure 13:
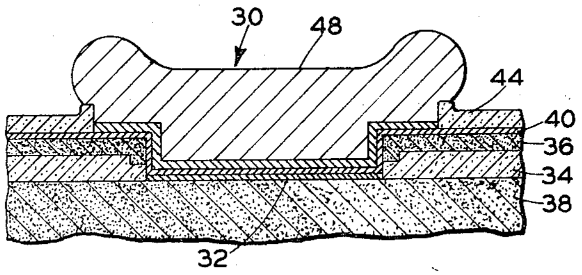
FIG. 13 is a view of the material of FIG. 14 after the silicon dioxide has been etched and gold has been plated onto the exposed platinum.

As shown on FIG. 12, a patterned layer 46 of photoresist was applied on top of the silicon dioxide coating 44. The photoresist material was Kodak Metal Etch Resist solution available from Eastman-Kodak Company of Rochester, New York and was applied to each of the slices by dropping four to six drops of the resist on one of the slices while whirling the slices at 7,500 r.p.m. for 30 seconds minimum on a conventional centrifugal slice coating table. The photoresist was baked at 70° C. for 30 minutes and then a photomask was aligned with the slice. Exposure of the photoresist was made under a Sylvania HGK Mercury Arc Lamp.

After exposure the slice was immersed in mineral spirits for approximately 2 minutes after which the slice was rinsed in Kodak Thin Film Resist Rinse for approximately 30 seconds and then centrifugally dried.

The silicon dioxide coating 44 was then selectively etched in a solution of buffered hydrofluoric acid through the openings that existed in the photoresist layer 46. The photoresist layer 46 was particularly adherent to the silicon dioxide coating 44 and, as a result, pattern definition was excellent when the silicon dioxide was etched. The resulting slice with the silicon dioxide coating 44 etched was one in which the silicon dioxide was formed into a very accurate and well-defined resist pattern which was tenaciously adherent to the underlying titanium layer 40.

A gold plating operation was then performed on the slice to provide a gold layer 48 on the platinum interconnection pattern. The gold plating was carried out in an acid gold citrate solution prepared in accordance with the formula: potassium gold cyanide, 20 grams; dibasic ammonium citrate, 50 grams; and sufficient water to make 1 liter of solution. Plating current was provided from a DC constant current supply with ripple less than 3 percent and current density was approximately 15–20 milliamperes per square inch.

It should be noted that as the gold builds up during plating, some side plating occurs. A certain amount of side plating is tolerable but some limitations do exist. The degree of side plating can be controlled by controlling the thickness of the inorganic resist coating in proportion to the ultimate gold thickness. In the specific example, the gold layer 48 was plated to a thickness of approximately 20,000 A. and the oxide coating 44 was approximately 3,000 A.

When the plated metal thickness becomes much greater than the inorganic resist thickness, excessive overplating will occur with the inherent risk of short circuits developing. The problem of excessive overplating is reduced if the ratio of plated metal thickness to inorganic resist thickness is kept below 10 to 1.

The photoresist layer 46 was then removed by immersing the slice 38 for 10 minutes in resist stripper heated to 130° C. available from Allied Chemical Corporation, New York, N.Y., under the trade designation A–20. After removal from the resist stripper, the slice 38 was immersed in boiling trichloroethylene for 2 minutes and finally reimmersed a third time in unused boiling trichloroethylene for 10 minutes. After this treatment, the slice 38 was rinsed successively in acetone, methanol and water.

After removal of the photoresist layer 46, the remaining silicon dioxide was removed by etching for 45 seconds in buffered hydrofluoric acid.

This left the interconnecting titanium exposed and the titanium was etched using phosphoric acid while the gold prevented etching of the titanium in the contact area.

Although certain embodiments of the invention have been shown in the drawings and described in the specification, it is to be understood that the invention is not limited thereto, is capable of modification and can be arranged without departing from the spirit and scope of the invention.

What is claimed is:

1. In a method of chemically altering selected areas of a metallic surface, the improvement which comprises the steps of:

selectively depositing a coating of silicon-type inorganic resist material to the areas of the metallic surface where the chemical altering is not desired; and subjecting the selectively coated metallic surface to an altering medium to which inorganic resist material is impervious whereby the portions of the metallic surface which are exposed to the medium are altered and the portions coated with resist material remain unchanged.

2. The method of selectively altering of claim 1 wherein the inorganic resist material is silicon dioxide.

3. The method of claim 1 wherein the exposed portions of the metallic surface are subjected to a plating medium and additional metal is plated to said exposed portions.

4. The method of selectively plating of claim 3 wherein the inorganic resist material is silicon dioxide.

5. The method of claim 4 wherein the ratio of thickness of the plated metal to the thickness of the silicon dioxide coating is less than 10 to 1, whereby side plating is controlled within desired limits.

6. The method of claim 4 wherein the silicon dioxide is deposited at a temperature higher than 250° C. whereby good adherence between the silicon dioxide and the metallic surface is assured.

7. The method of claim 6 wherein the silicon dioxide is deposited at a temperature of less than 360° C. on the metallic surface which is titanium.

8. In a process for electrochemically changing selected portions of a metallic surface wherein photosensitive resists are used to define the selected portions, the improvement which comprises:

coating the metal with the silicon dioxide;

coating the silicon dioxide coating with an energy-sensitive resist material;

exposing selected portions of the resist material to an energy source;

developing the resist material leaving the desired pattern of resist material on the silicone dioxide coating and leaving portions of the silicon dioxide coating exposed;

subjecting the exposed portions of the silicon dioxide coating to an etching solution to remove said portions from the metallic surface and to thereby selectively expose portions of said metallic surface; and subjecting the exposed portions of the metallic surface to an electrochemical medium whereby said exposed surfaces are selectively introduced to the electrochemical reaction.

9. The method of claim 8 wherein the electrochemical reaction results in a plating of additional metal onto said exposed portions of said metallic surface.

10. The method of claim 9 wherein the ratio of thickness of the metal plated during the electrochemical reaction to the thickness of the silicon dioxide coating is less than 10 to 1 whereby side plating is controlled within desired limits.

11. A method of selectively plating gold onto integrated circuits which comprises the steps of:

coating an outer metallic layer of the circuits with silicon dioxide by placing the circuits in a reaction chamber in which silicon dioxide is produced at a temperature less than 360° C.;

coating the silicon dioxide coating with an energy-sensitive resist material;

exposing and developing selected portions of the energy-sensitive resist material to leave desired portions of the silicon dioxide uncoated;

subjecting the uncoated portions of the silicon dioxide coating to an etching solution to remove said portions from the circuits; and placing the circuits in a gold plating medium whereby gold is selectively plated onto the circuits in the areas where the silicon dioxide coating is removed and a gold pattern of a desired configuration is produced.

* * * * *

Disclaimer 3,644,180.—*Russell Burock*, Allentown, *David M. Swirsky*, Minersville, and *Robert A. Whitner*, Allentown, Pa. METHOD OF USING INORGANIC RESISTS. Patent dated Feb. 22, 1972. Disclaimer filed May 8, 1972, by the assignee, *Western Electric Company, Incorporated.*

Hereby enters this disclaimer to claims 1, 2 and 8 of said patent.

[*Official Gazette January 2, 1973.*]